US011071135B2

(12) United States Patent
Lin

(10) Patent No.: US 11,071,135 B2
(45) Date of Patent: Jul. 20, 2021

(54) UPLINK TRANSMISSION METHOD BASED ON UPLINK REFERENCE SIGNAL, TERMINAL, AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 61 days.

(21) Appl. No.: 16/475,860

(22) PCT Filed: Jan. 4, 2017

(86) PCT No.: PCT/CN2017/070186
§ 371 (c)(1),
(2) Date: Jul. 3, 2019

(87) PCT Pub. No.: WO2018/126363
PCT Pub. Date: Jul. 12, 2018

(65) Prior Publication Data
US 2020/0196342 A1 Jun. 18, 2020

(51) Int. Cl.
*H04W 72/12* (2009.01)
*H04L 5/00* (2006.01)
*H04W 72/04* (2009.01)

(52) U.S. Cl.
CPC ....... *H04W 72/1284* (2013.01); *H04L 5/0048* (2013.01); *H04L 5/0053* (2013.01);
(Continued)

(58) Field of Classification Search
CPC ......... H04W 72/1284; H04W 72/1268; H04W 72/0413; H04W 72/128; H04L 5/0048; H04L 5/0053; H04L 5/0094
See application file for complete search history.

(56) References Cited

U.S. PATENT DOCUMENTS 8,755,340 B2 * 6/2014 Anderson ............ H04W 76/28
370/329
2010/0074201 A1 3/2010 Wu
(Continued)

FOREIGN PATENT DOCUMENTS

CA 2951524 A1 12/2015
CN 101686489 A 3/2010
(Continued)

OTHER PUBLICATIONS

International Search Report in International application No. PCT/CN2017/070186, dated Sep. 27, 2017.
(Continued)

*Primary Examiner* — Wei Zhao

(57) ABSTRACT

Provided are an uplink transmission method, a terminal, and a network device. The uplink transmission method comprises: determining a first time-frequency resource and a second time-frequency resource allocated by a network device, wherein the first time-frequency resource is used for transmitting an uplink scheduling request, and the second time-frequency resource is used for transmitting an uplink reference signal; and when uplink data needs to be sent to the network device, the first time-frequency resource is used to send an uplink scheduling request to the network device, and the second time-frequency resource is used to send an uplink reference signal to the network device, so that the network device uses the uplink reference signal to determine the quality of an uplink channel, thereby effectively reducing the uplink delay in the uplink resource scheduling process.

19 Claims, 4 Drawing Sheets

(52) U.S. Cl.
CPC ....... *H04L 5/0094* (2013.01); *H04W 72/0413* (2013.01); *H04W 72/1268* (2013.01)

(56) References Cited

U.S. PATENT DOCUMENTS

| | | | |
|---|---|---|---|
| 2012/0147778 A1* | 6/2012 | Ishii | H04W 72/1268 370/252 |
| 2014/0133447 A1 | 5/2014 | Moulsley et al. | |
| 2017/0331670 A1* | 11/2017 | Parkvall | H04W 24/10 |
| 2019/0222372 A1 | 7/2019 | Guo et al. | |

FOREIGN PATENT DOCUMENTS

| | | |
|---|---|---|
| CN | 103532658 A | 1/2014 |
| CN | 103687025 A | 3/2014 |
| CN | 103782640 A | 5/2014 |
| CN | 103929754 A | 7/2014 |
| EP | 2166812 A2 | 3/2010 |
| EP | 2560448 A1 | 2/2013 |
| EP | 3509369 A1 | 7/2019 |
| EP | 3547771 A1 | 10/2019 |
| TW | 201538020 A | 10/2015 |

OTHER PUBLICATIONS

Written Opinion of the International Search Authority in international application No. PCT/CN2017/070186, dated Sep. 27, 2017.
Supplementary European Search Report in the European application No. 17889721.1, dated Dec. 12, 2019.
English translation of the Written Opinion of the International Search Authority in the international application No. PCT/CN2017/070186, dated Sep. 27, 2017.
First Office Action of the Chilean application No. 201901807, dated Apr. 20, 2020.
First Office Action of the Chinese application No. 201780081669.X, dated Jul. 1, 2020.
Second Office Action of the Chilean application No. 201901807, dated Aug. 17, 2020.
First Office Action of the Indian application No. 201917030666, dated Aug. 17, 2020.

\* cited by examiner

UPLINK TRANSMISSION METHOD BASED ON UPLINK REFERENCE SIGNAL, TERMINAL, AND NETWORK DEVICE

TECHNICAL FIELD

The embodiments of the disclosure relate to the field of communications, and in particular to an uplink transmission method, a terminal and a network device.

BACKGROUND

In an existing Long Term Evolution (LTE) system, when a terminal has a request for transmitting uplink data, a Scheduling Request (SR) is transmitted to a base station. After receiving the SR, the base station allocates an uplink dedicated channel resource to the terminal. The terminal reports a Buffer Status Report (BSR) of the uplink data to be transmitted to the base station on the uplink dedicated channel resource allocated by the base station, the BSR indicating the volume of data to be transmitted by the terminal. After receiving the BSR of the terminal, the base station allocates an uplink resource to the terminal for transmitting uplink data.

However, the base station must first know uplink channel quality before allocating the uplink resource to the terminal, and the base station needs to estimate the uplink channel quality according to a Sounding Reference Signal (SRS) reported by the terminal. Therefore, before the base station schedules the uplink resource for the terminal, the terminal needs to instruct the terminal to report the SRS, so that the base station evaluates the uplink channel quality, and allocates a suitable uplink channel for the terminal to transmit an uplink signal.

As can be seen from the above, the existing uplink resource scheduling process generates a long uplink delay.

SUMMARY

The embodiments of the disclosure provide an uplink transmission method, a terminal and a network device, which can effectively reduce the uplink delay in an uplink resource scheduling process.

According to a first aspect, an uplink transmission method is provided. The method for uplink transmission may include that: a first time-frequency resource and a second time-frequency resource allocated by a network device are determined, the first time-frequency resource being used for transmitting an uplink SR, and the second time-frequency resource being used for transmitting an uplink reference signal; and responsive to that uplink data needs to be transmitted to the network device, the first time-frequency resource is used to transmit an uplink SR to the network device, and the second time-frequency resource is used to transmit an uplink reference signal to the network device, so that the network device determines quality of an uplink channel by using the uplink reference signal.

In the embodiments of the disclosure, when the terminal transmits an uplink SR to the network device, the terminal actively reports an uplink reference signal to the network device, so that the network device may directly estimate uplink channel quality based on the uplink reference signal that is pre-reported by the terminal when an uplink resource is allocated to the terminal Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

Optionally, in a possible implementation, the terminal transmits an uplink reference signal to the network device via a pre-configured uplink reference signal sequence on the second time-frequency resource.

Specifically, the uplink reference signal sequence may be pre-configured by the network device for the terminal, and the terminal may determine the uplink reference signal sequence by receiving signaling from the network device or through system pre-configuration information. In summary, both the network device and the terminal are aware of the uplink reference signal sequence.

In conjunction with the first aspect, in some possible implementations of the first aspect, the operation of transmitting the uplink reference signal to the network device via the second time-frequency resource may include that: a data volume of uplink data required to be transmitted is determined; a target time-frequency resource is determined from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data; and the target time-frequency resource is used to transmit the uplink reference signal to the network device.

In the embodiments of the disclosure, the preset information indicates a correspondence between data volume ranges and time-frequency resources, and the data volume ranges are in one-to-one correspondence with the time-frequency resources. Therefore, when the network device receives an uplink reference signal transmitted by the terminal using a target time-frequency resource, the data volume range of uplink data to be transmitted by the terminal may be estimated based on the preset information and the target time-frequency resource. In this case, when the network device receives an uplink SR transmitted by the terminal on the pre-configured first time-frequency resource, and an uplink reference signal transmitted by the terminal on the pre-configured target time-frequency resource (included in the second time-frequency resource), the following information can be determined: required uplink data transmission of the terminal, the size range of a data volume of uplink data to be transmitted by the terminal, and an uplink reference signal. The network device may estimate the uplink channel quality based on the uplink reference signal, and then allocate the uplink resource to the terminal based on the estimated uplink channel quality and the size range of the data volume of the uplink data to be transmitted by the terminal. In other words, the embodiments of the disclosure provide a solution, responsive to that the terminal needs to transmit uplink data, after the uplink SR and the uplink reference signal are reported to the network device based on the time-frequency resource pre-configured by the network device and the preset information, an uplink resource allocated by the network device to the terminal can be obtained, and uplink data is transmitted to the network device by using the uplink resource. Therefore, the uplink transmission method provided by the embodiments of the disclosure can effectively reduce the uplink delay in the uplink resource scheduling process compared with the existing uplink resource scheduling process.

In conjunction with the first aspect, in some possible implementations of the first aspect, the preset information may include correspondences between data volume ranges and uplink reference signal configuration information, the uplink reference signal configuration information may be used for indicating a time-frequency resource and sequence of an uplink reference signal, different data volume ranges may correspond to different uplink reference signal configuration information, and the target time-frequency resource may be a time-frequency resource indicated by the uplink reference signal configuration information corresponding to the target data volume range.

In the present solution, after receiving the uplink reference signal reported by the terminal, the data volume of the uplink data to be transmitted by the terminal may be estimated according to the time-frequency resource and the preset information carrying the uplink reference signal, and thus a reasonable uplink resource may be allocated to the terminal. The uplink delay of the uplink resource scheduling process can be reduced as a whole.

Optionally, in a possible implementation, the uplink SR may carry uplink reference signal configuration information corresponding to the target data volume range.

In the embodiments of the disclosure, the network device may determine uplink reference signal configuration information selected by the terminal through the received uplink SR, and then determine a data volume range corresponding to the uplink reference signal configuration information selected by the terminal based on the preset information, so that the data volume of uplink data to be transmitted by the terminal may be estimated, and then an uplink resource is allocated to the terminal, thereby improving the efficiency of allocating the uplink resource to the terminal, and reducing the uplink delay in the uplink resource scheduling process.

In conjunction with the first aspect, in some possible implementations of the first aspect, the uplink transmission method may further include that: the preset information is acquired by receiving signaling from the network device or through system pre-configuration information.

In conjunction with the first aspect, in some possible implementations of the first aspect, the first resource may be a Physical Uplink Control Channel (PUCCH) resource, and the uplink reference signal may be an SRS.

According to a second aspect, an uplink transmission method is provided. The method for uplink transmission may include that: a first time-frequency resource and a second time-frequency resource are allocated to a terminal, the first time-frequency resource being used for transmitting an uplink SR, and the second time-frequency resource being used for transmitting an uplink reference signal; responsive to that the terminal needs to transmit uplink data, an uplink SR which is transmitted by the terminal via the first time-frequency resource is received, and an uplink reference signal which is transmitted by the terminal via the second time-frequency resource is received; and uplink channel quality is determined according to the uplink reference signal transmitted by the terminal.

In the embodiments of the disclosure, when the terminal transmits an uplink SR to the network device, the terminal actively reports an uplink reference signal to the network device, so that the network device may directly estimate uplink channel quality based on the uplink reference signal that is pre-reported by the terminal when an uplink resource is allocated to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

In conjunction with the second aspect, in some possible implementations of the second aspect, the operation of receiving an uplink reference signal which is transmitted by the terminal via the second time-frequency resource may include that: the uplink reference signal which is transmitted by the terminal via a target time-frequency resource in the second time-frequency resource is received, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

In the embodiments of the disclosure, the preset information indicates a correspondence between data volume ranges and time-frequency resources, and the data volume ranges are in one-to-one correspondence with the time-frequency resources. Therefore, when the network device receives an uplink reference signal transmitted by the terminal using a target time-frequency resource, the data volume range of uplink data to be transmitted by the terminal may be estimated based on the preset information and the target time-frequency resource. In this case, when the network device receives an uplink SR transmitted by the terminal on the pre-configured first time-frequency resource, and an uplink reference signal transmitted by the terminal on the pre-configured target time-frequency resource (included in the second time-frequency resource), the following information can be determined: required uplink data transmission of the terminal, the size range of a data volume of uplink data to be transmitted by the terminal, and an uplink reference signal. The network device may estimate the uplink channel quality based on the uplink reference signal, and then allocate the uplink resource to the terminal based on the estimated uplink channel quality and the size range of the data volume of the uplink data to be transmitted by the terminal. In other words, the embodiments of the disclosure provide a solution, responsive to that the terminal needs to transmit uplink data, after the uplink SR and the uplink reference signal are reported to the network device based on the time-frequency resource pre-configured by the network device and the preset information, an uplink resource allocated by the network device to the terminal can be obtained, and uplink data is transmitted to the network device by using the uplink resource. Therefore, the uplink transmission method provided by the embodiments of the disclosure can effectively reduce the uplink delay in the uplink resource scheduling process compared with the existing uplink resource scheduling process.

In conjunction with the second aspect, in some possible implementations of the second aspect, the preset information may include correspondences between data volume ranges and uplink reference signal configuration information, the uplink reference signal configuration information may be used for indicating a time-frequency resource and sequence of an uplink reference signal, different data volume ranges may correspond to different uplink reference signal configuration information, and the target time-frequency resource may be a time-frequency resource indicated by the uplink reference signal configuration information corresponding to the target data volume range.

In the embodiments of the disclosure, after receiving the uplink reference signal reported by the terminal, the data volume of the uplink data to be transmitted by the terminal may be estimated according to the time-frequency resource and the preset information carrying the uplink reference signal, and thus a reasonable uplink resource may be allocated to the terminal. The uplink delay of the uplink resource scheduling process can be reduced as a whole.

In conjunction with the second aspect, in some possible implementations of the second aspect, the uplink SR may carry uplink reference signal configuration information corresponding to the target data volume range.

In the embodiments of the disclosure, the network device may determine uplink reference signal configuration information selected by the terminal through the received uplink SR, and then determine a data volume range corresponding to the uplink reference signal configuration information selected by the terminal based on the preset information, so that the data volume of uplink data to be transmitted by the terminal may be estimated, and then an uplink resource is allocated to the terminal, thereby improving the efficiency of allocating the uplink resource to the terminal, and reducing the uplink delay in the uplink resource scheduling process.

In conjunction with the second aspect, in some possible implementations of the second aspect, the uplink transmission method may further include that: a data volume of uplink data to be transmitted by the terminal is estimated according to the preset information and the target time-frequency resource; and an uplink resource is allocated to the terminal according to the uplink channel quality and the estimated data volume of the uplink data to be transmitted by the terminal.

In conjunction with the second aspect, in some possible implementations of the second aspect, the uplink transmission method may further include that: the preset information is generated; and the terminal is notified of the preset information by signaling issuing or system pre-configuration.

In conjunction with the second aspect, in some possible implementations of the second aspect, the first resource may be a PUCCH resource, and the uplink reference signal may be an SRS.

According to a third aspect, an uplink transmission method is provided. The method for uplink transmission may include that: a second time-frequency resource allocated by a network device and used for transmitting an uplink reference signal is determined; responsive to that uplink data needs to be transmitted to the network device, a data volume of the uplink data is determined; a target time-frequency resource is determined from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data; and the target time-frequency resource is used to transmit an uplink reference signal to the network device, so that the network device determines uplink channel quality according to the uplink reference signal, the uplink reference signal being further used in requesting the network device to schedule an uplink resource.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

In conjunction with the third aspect, in some possible implementations of the third aspect, the preset information may include correspondences between data volume ranges and uplink reference signal configuration information, the uplink reference signal configuration information may be used for indicating a time-frequency resource and sequence of an uplink reference signal, different data volume ranges may correspond to different uplink reference signal configuration information, and the target time-frequency resource may be a time-frequency resource indicated by the uplink reference signal configuration information corresponding to the target data volume range.

According to a fourth aspect, an uplink transmission method is provided. The method for uplink transmission may include that: a second time-frequency resource for transmitting an uplink reference signal is allocated to a terminal; an uplink reference signal which is transmitted by the terminal via a target time-frequency resource in the second time-frequency resource is blindly detected, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data; and it is determined that the terminal requests to schedule an uplink resource according to the blindly-detected uplink reference signal, and uplink channel quality is determined according to the uplink reference signal.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

In conjunction with the fourth aspect, in some possible implementations of the fourth aspect, the preset information may include correspondences between data volume ranges and uplink reference signal configuration information, the uplink reference signal configuration information may be used for indicating a time-frequency resource and sequence of an uplink reference signal, different data volume ranges may correspond to different uplink reference signal configuration information, and the target time-frequency resource may be a time-frequency resource indicated by the uplink reference signal configuration information corresponding to the target data volume range.

According to a fifth aspect, a terminal is provided. The terminal is configured to perform the method in the first aspect or any one possible implementation of the first aspect. Specifically, the terminal may include a module for performing the method in the first aspect or any one possible implementation of the first aspect.

According to a sixth aspect, a network device is provided. The network device is configured to perform the method in the second aspect or any one possible implementation of the second aspect. Specifically, the network device may include a module for performing the method in the second aspect or any one possible implementation of the second aspect.

According to a seventh aspect, a terminal is provided. The terminal is configured to perform the method in the third aspect or any one possible implementation of the third aspect. Specifically, the terminal may include a module for performing the method in the third aspect or any one possible implementation of the third aspect.

According to an eighth aspect, a network device is provided. The network device is configured to perform the method in the fourth aspect or any one possible implementation of the fourth aspect. Specifically, the network device may include a module for performing the method in the fourth aspect or any one possible implementation of the fourth aspect.

According to a ninth aspect, a terminal is provided. The terminal includes a memory and a processor. The memory is configured to store an instruction. The processor is configured to execute the instruction stored in the memory, and by executing the instruction stored in the memory, the processor is enabled to perform the method in the first aspect or any one possible implementation of the first aspect.

According to a tenth aspect, a network device is provided. The network device includes a memory and a processor. The memory is configured to store an instruction. The processor is configured to execute the instruction stored in the memory, and by executing the instruction stored in the memory, the processor is enabled to perform the method in the second aspect or any one possible implementation of the second aspect.

According to an eleventh aspect, a terminal is provided. The terminal includes a memory and a processor. The memory is configured to store an instruction. The processor is configured to execute the instruction stored in the memory, and by executing the instruction stored in the memory, the processor is enabled to perform the method in the third aspect or any one possible implementation of the third aspect.

According to a twelfth aspect, a network device is provided. The terminal includes a memory and a processor. The memory is configured to store an instruction. The processor is configured to execute the instruction stored in the memory, and by executing the instruction stored in the memory, the processor is enabled to perform the method in the fourth aspect or any one possible implementation of the fourth aspect.

According to a thirteenth aspect, a computer-readable medium for storing a computer program is provided. The computer program includes an instruction for performing the method in the first aspect or any possible implementation of the first aspect.

According to a fourteenth aspect, a computer-readable medium for storing a computer program is provided. The computer program includes an instruction for performing the method in the second aspect or any possible implementation of the second aspect.

According to a fifteenth aspect, a computer-readable medium for storing a computer program is provided. The computer program includes an instruction for performing the method in the third aspect or any possible implementation of the third aspect.

According to a sixteenth aspect, a computer-readable medium for storing a computer program is provided. The computer program includes an instruction for performing the method in the fourth aspect or any possible implementation of the fourth aspect.

BRIEF DESCRIPTION OF DRAWINGS

In order to describe the technical solutions in the embodiments of the disclosure more clearly, the drawings required to be used in descriptions about the embodiments or the conventional art will be simply introduced below. It is apparent that the drawings in the following descriptions are only some embodiments of the disclosure. Those of ordinary skilled in the art may further obtain other drawings according to these drawings without creative work.

DETAILED DESCRIPTION

Figure 1:
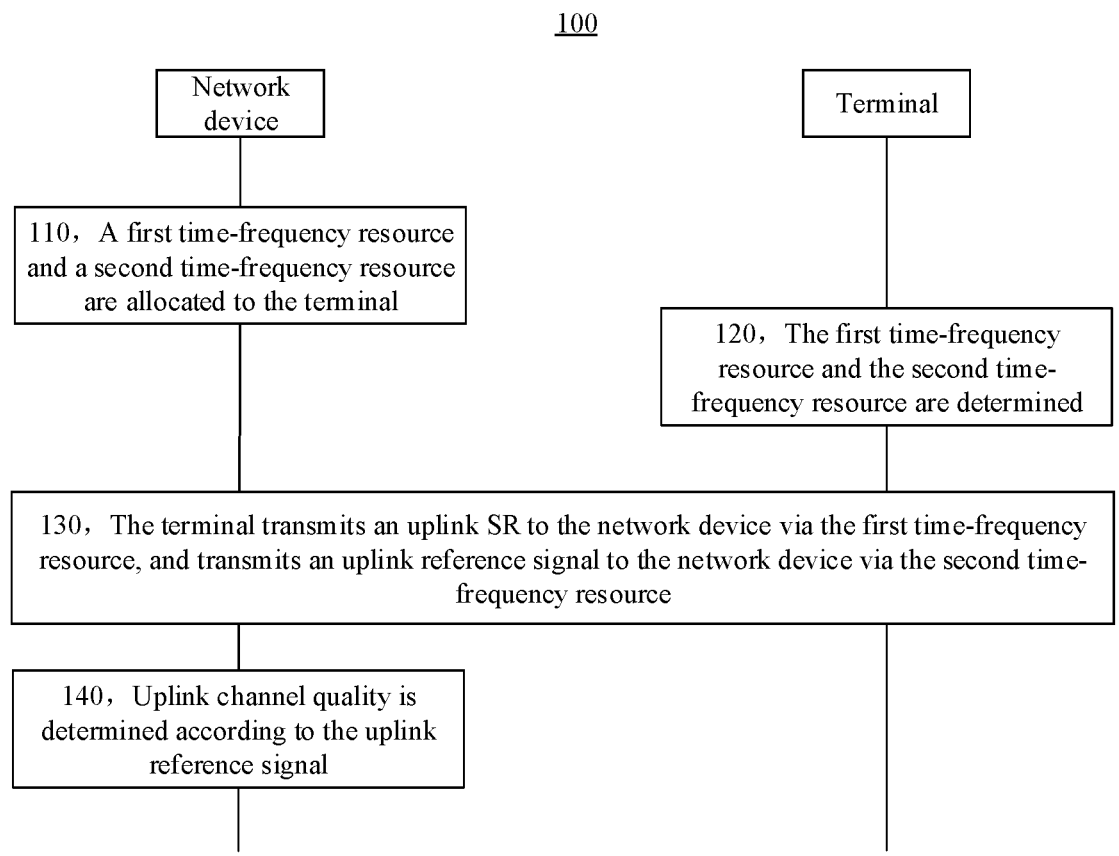
FIG. 1 is a schematic flowchart of an uplink transmission method according to an embodiment of the disclosure.

The technical solutions in the embodiments of the disclosure are clearly and completely described in the following with reference to the accompanying drawings in the embodiments of the disclosure. It is apparent that the described embodiments are a part of the embodiments of the disclosure, but not all of the embodiments. All other embodiments obtained by those skilled in the art based on the embodiments of the disclosure without creative efforts fall within the scope of protection of the embodiments of the disclosure.

The technical solutions of the embodiments of the disclosure may be applied to various communication systems such as a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD), a Universal Mobile Telecommunication System (UMTS), or a Worldwide Interoperability for Microwave Access (WiMAX) communication system, a future 5G system or a New Radio Technology (NR) system.

The technical solution of the embodiments of the disclosure relates to a terminal. The terminal may also be called a User Equipment (UE), an access terminal, a user unit, a user station, a mobile radio station, a mobile station, a remote station, a remote terminal, a mobile device, a user terminal, a terminal device, a wireless communication device, a user agent, or a user apparatus. For example, the access terminal may be a mobile phone (or called a cellular phone), a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, a terminal in a future 5G network or a network after 5G, which is not limited in the embodiments of the disclosure. The terminal may communicate with one or more core networks via a Radio Access Network (RAN), or may access a distributed peer-to-peer (Ad-Hoc) mode network and a sub-network deployed by a user through self-organizing or unauthorized access, and the terminal may also access the network to communicate in other manners, which is not limited in the embodiments of the disclosure.

The technical solution of the embodiments of the disclosure also relates to a network device. The network device may be a network side device for communicating with a user device. Specifically, the network device may be a network device that provides wireless access and communication services for mobile or fixed terminals in a cell. For example, the network device may be a Base Transceiver Station (BTS) in a GSM system or a CDMA system, or may be a NodeB (NB) in a WCDMA system, or may be an Evolutional Node B (eNB or eNodeB) in an LTE system. Or the network device may also be a relay station, an access point, an in-vehicle device, or a wearable device. The network device may also be a network side device in a future 5G network or a network after 5G, a network side device in a future evolved PLMN network, or a network side device in an NR network.

As can be seen from the above, the existing uplink resource scheduling process may generate a long uplink delay. In the 5G system or the NR system currently under discussion, some services may require a very short scheduling delay. If the conventional art is used to implement uplink resource scheduling, the requirements of services requiring a short uplink scheduling delay cannot be met.

For the above technical problem, the embodiments of the disclosure provide an uplink transmission method, a network device and a terminal, which can effectively reduce the delay in an uplink resource scheduling process.

FIG. 1 is a schematic flowchart of an uplink transmission method 100 according to an embodiment of the disclosure. The method for uplink transmission 100 includes the operations as follows.

At 110, a network device allocates a first time-frequency resource and a second time-frequency resource to a terminal, the first time-frequency resource being used for transmitting an uplink SR, and the second time-frequency resource being used for transmitting an uplink reference signal.

Specifically, the network device allocates, in advance, a first time-frequency resource for transmitting an uplink SR and a second time-frequency resource for transmitting an uplink reference signal to the terminal. In other words, a base station pre-specifies a time domain resource and a frequency domain resource that can be occupied by the uplink SR, and also pre-specifies a time-frequency resource and a frequency domain resource that can be occupied by the uplink reference signal. In this case, the terminal may actively transmit the uplink reference signal to the network device on the time-frequency resource allocated by the network device. It is to be understood that the network device may determine uplink channel quality according to the uplink reference signal reported by the terminal.

Specifically, the first time-frequency resource is, for example, a PUCCH resource. Optionally, the first time-frequency resource may also be other pre-assigned uplink transmission resources, for example, an uplink resource used by the terminal to contend for access, and specifically, for example, a Physical Random Access Channel (RACH) in an LTE system.

Specifically, the second time-frequency resource may also be referred to as an uplink reference signal transmission resource.

It is to be understood that the second time-frequency resource is different from the first time-frequency resource.

At 120, the terminal determines the first time-frequency resource and the second time-frequency resource allocated by the network device.

Optionally, as an implementation, the terminal may determine the first time-frequency resource and the second time-frequency resource by receiving signaling issued by the network device.

Specifically, for example, the network device transmits Radio Resource Control (RRC) signaling to the terminal, where the RRC signaling carries information indicating the first time-frequency resource and the second time-frequency resource, in other words, the RRC signaling indicates time domain information and frequency domain information of a time-frequency resource used for transmitting an uplink SR, and the RRC signaling further indicates time domain information and frequency domain information of a time-frequency resource used for transmitting an uplink reference signal. According to the RRC signaling, the terminal can determine the first time-frequency resource used for transmitting the uplink SR and the second time-frequency resource used for transmitting the uplink reference signal.

Optionally, as another implementation, the terminal may determine the first time-frequency resource and the second time-frequency resource through system pre-configuration information.

Specifically, for example, after the network device allocates the first time-frequency resource and the second time-frequency resource to the terminal, system pre-configuration information is configured on the terminal through a communication protocol, where the system pre-configuration information carries information indicating the first time-frequency resource and the second time-frequency resource, in other words, the system pre-configuration information indicates time domain information and frequency domain information of a time-frequency resource used for transmitting an uplink SR, and the system pre-configuration information further indicates time domain information and frequency domain information of a time-frequency resource used for transmitting an uplink reference signal. By using the system pre-configuration information, the terminal can determine the first time-frequency resource used for transmitting the uplink SR and the second time-frequency resource used for transmitting the uplink reference signal.

At 130, responsive to that uplink data needs to be transmitted to the network device, the terminal transmits an uplink SR to the network device via the first time-frequency resource, and transmits an uplink reference signal to the network device via the second time-frequency resource.

It is to be understood that the SR transmitted by the terminal to the network device is used to notify the network device that the terminal needs to upload uplink data. Specifically, the uplink SR may only carry information of 1 Bit.

Specifically, for example, the first time-frequency resource is a PUCCH resource, and the terminal may transmit an uplink SR to the network device by using Uplink Control Information (UCI) on the PUCCH resource.

Specifically, the uplink reference signal transmitted by the terminal to the network device is, for example, an SRS. The network device may estimate uplink channel quality according to the SRS reported by the terminal and the information known by the network device. It is to be understood that the uplink reference signal may also be any other reference signal that may cause the network device to estimate the uplink channel quality.

At 140, after receiving the uplink SR transmitted by the terminal using the first time-frequency resource, the network device determines that the terminal needs to upload uplink data, and needs to allocate uplink data to the terminal; and after receiving the uplink reference signal transmitted by the terminal using the second time-frequency resource, the network device may determine uplink channel quality according to the uplink reference signal.

In the embodiments of the disclosure, after the network device receives the uplink SR transmitted by the terminal, the network device may allocate an uplink dedicated channel resource, for example, a Physical Uplink Shared Channel (PUSCH) resource to the terminal. The terminal reports a data volume of uplink data to be transmitted to the network device on the PUSCH resource allocated by the network device, for example, the terminal reports a BSR to the network device, and the BSR can indicate the data volume of the uplink data to be reported by the terminal. After receiving an uplink reference signal (for example, SRS) transmitted by the terminal, the network device may determine uplink channel quality according to the uplink reference signal, and then the network device may allocate an uplink resource to the terminal according to the uplink channel quality and the uplink data reported by the terminal, so that the terminal may use the uplink resource to report uplink data.

As described above, in the embodiments of the disclosure, responsive to that the terminal needs to transmit uplink data, the terminal may use the pre-configured first time-frequency resource to report an uplink SR to the network device, and may also use the pre-configured second time-frequency resource to actively report an uplink reference signal to the network device, so that the network device may directly estimate uplink channel quality based on the uplink reference signal that is pre-reported by the terminal when allocating an uplink resource to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process. Specifically, in operation 130, the terminal transmits an uplink reference signal to the network device via a pre-configured uplink reference signal sequence on the second time-frequency resource.

It is to be understood that the uplink reference signal sequence refers to amplitude information and phase information of the uplink reference signal, and a correspondence between the amplitude information and phase information and a time-frequency resource carrying the uplink reference signal.

For example, the uplink reference signal sequence may indicate that the uplink reference signal is a certain Z-C sequence having a length of 24, and a transmission resource of the uplink reference signal is located in the middle two Physical Resource Blocks (PRBs) of the last symbol of a subframe D. For another example, the uplink reference signal sequence may indicate that the uplink reference signal is a certain Z-C sequence having a length of 72, and a transmission resource of the uplink reference signal is located in the middle six PRBs of the last second symbol of a subframe D. For another example, the uplink reference signal sequence may indicate that the uplink reference signal is a certain Z-C sequence having a length of 144, and a transmission resource of the uplink reference signal is located in the middle 12 PRBs of the last third symbol of a subframe D.

Specifically, the uplink reference signal sequence may be pre-configured by the network device for the terminal, and the terminal may determine the uplink reference signal sequence by receiving signaling from the network device or through system pre-configuration information. In summary, both the network device and the terminal are aware of the uplink reference signal sequence.

Figure 2:
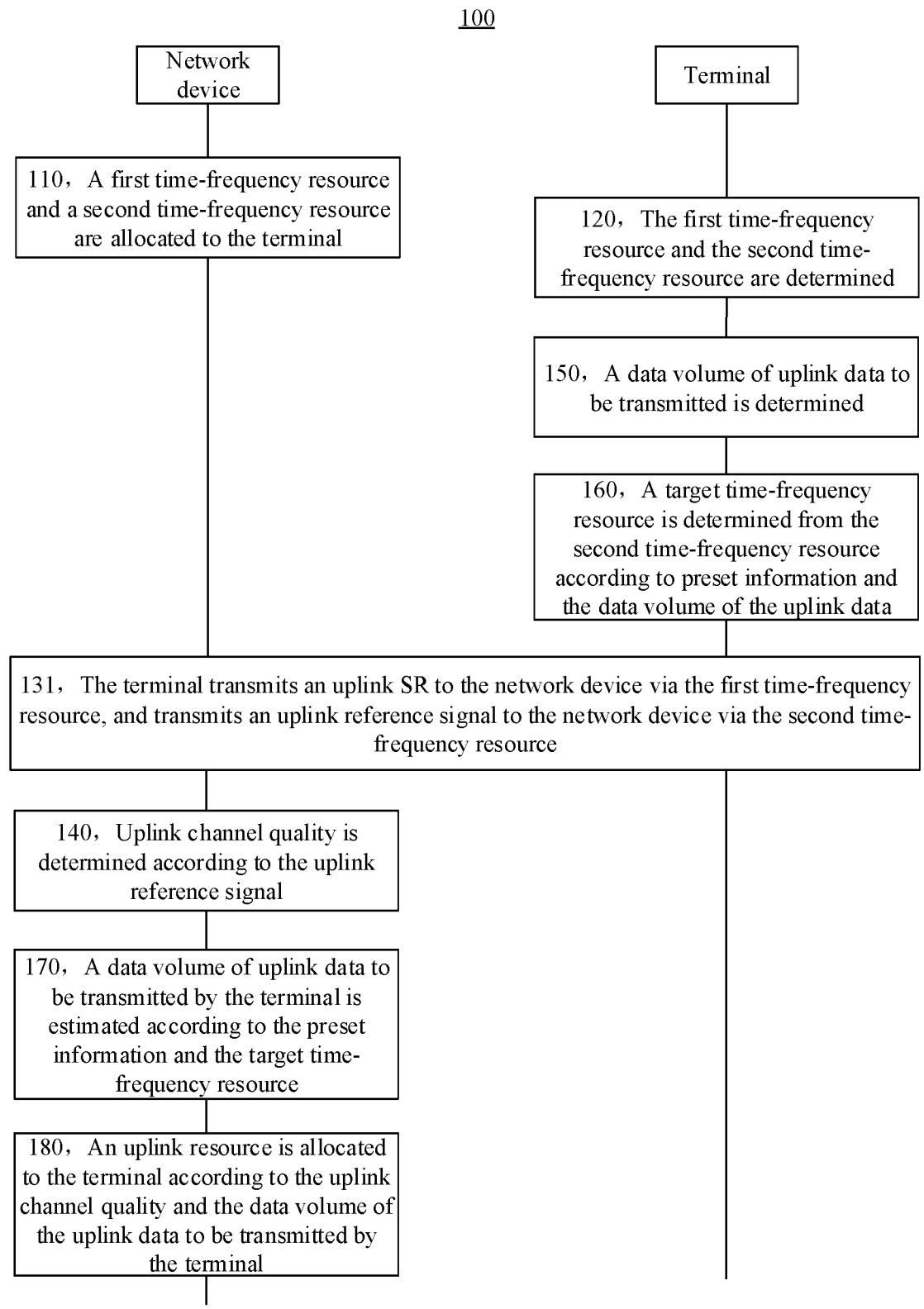
FIG. 2 is another schematic flowchart of an uplink transmission method according to an embodiment of the disclosure.

Optionally, as illustrated in FIG. 2, in some embodiments, before the terminal transmits the uplink reference signal to the network device, the uplink transmission method 100 further includes the operations as follows.

At 150, the terminal determines a data volume of uplink data required to be transmitted.

At 160, the terminal determines a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

For example, the preset information is as illustrated in Table 1:

TABLE 1

| Data volume range | Time-frequency resource |
| --- | --- |
| Data volume range 1 (for example, less than or equal to A) | Sub-time-frequency resource 1 |
| Data volume range 2 (for example, greater than A and less than or equal to B) | Sub-time-frequency resource 2 |
| Data volume range 3 (for example, greater than B and less than or equal to C) | Sub-time-frequency resource 3 |
| Data volume range 4 (for example, greater than C) | Sub-time-frequency resource 4 |

A, B and C are positive numbers, and A<B<C. The sub-time-frequency resource 1, the sub-time-frequency resource 2, the sub-time-frequency resource 3, and the sub-time-frequency resource 4 all belong to the second time-frequency resource. In the second row to the fourth row of Table 1, the first column of each row has a corresponding relationship with the second column of the row.

It is assumed that in operation 150, the terminal determines that the data volume of the uplink data required to be transmitted is within the data volume range 2 illustrated in Table 1, and determines that the data volume range 2 is a target data volume range. If the sub-time-frequency resource 2 corresponds to the target data volume range, it is determined that the sub-time-frequency resource 2 is the target time-frequency resource.

As illustrated in FIG. 2, operation 130 of using, by the terminal, the second time-frequency resource to transmit the uplink reference signal to the network device specifically includes: 131, transmitting the uplink reference signal to the network device via the target time-frequency resource.

Specifically, in the example described above in conjunction with Table 1, the terminal transmits the uplink reference signal to the network device by using the sub-time-frequency resource 2.

As illustrated in FIG. 2, after the network device receives the uplink reference signal transmitted by the terminal, the uplink transmission method 100 further includes the operations as follows.

At 170, the network device estimates a data volume of uplink data to be transmitted by the terminal according to the preset information and the target time-frequency resource.

Specifically, after receiving the uplink reference signal transmitted by the terminal, the network device may determine that a time-frequency resource carrying the uplink reference signal is the target time-frequency resource; then, the network device determines a target data volume range corresponding to the target time-frequency based on the preset information (for example, Table 1); and finally, a data volume of uplink data to be transmitted by the terminal is estimated according to the target data volume range.

The preset information illustrated in Table 1 is taken as an example. If the target time-frequency resource is the sub-time-frequency resource 2 illustrated in Table 1, the network device determines, according to the preset information, the target data volume range as the data volume range 2, and then estimates that the data volume of uplink data to be transmitted by the terminal is within the data volume range 2. For example, the data volume of the uplink data to be transmitted by the terminal is greater than A and less than or equal to B.

At 180, the network device allocates an uplink resource to the terminal according to the uplink channel quality determined in operation 140 and the data volume of the uplink data to be transmitted by the terminal estimated in operation 170.

It is to be understood that in the embodiments of the disclosure, the preset information indicates a correspondence between data volume ranges and time-frequency resources, and the data volume ranges are in one-to-one correspondence with the time-frequency resources. Therefore, when the network device receives an uplink reference signal transmitted by the terminal using a target time-frequency resource, the data volume range of uplink data to be transmitted by the terminal may be estimated based on the preset information and the target time-frequency resource. In this case, when the network device receives an uplink SR transmitted by the terminal on the pre-configured first time-frequency resource, and an uplink reference signal transmitted by the terminal on the pre-configured target time-frequency resource (included in the second time-frequency resource), the following information can be determined: required uplink data transmission of the terminal, the size range of a data volume of uplink data to be transmitted by the terminal, and an uplink reference signal. The network device may estimate the uplink channel quality based on the uplink reference signal, and then allocate the uplink resource to the terminal based on the estimated uplink channel quality and the size range of the data volume of the uplink data to be transmitted by the terminal. In other words, the embodiments of the disclosure provide a solution, responsive to that the terminal needs to transmit uplink data, after the uplink SR and the uplink reference signal are reported to the network device based on the time-frequency resource pre-configured by the network device and the preset information, an uplink resource allocated by the network device to the terminal can be obtained, and uplink data is transmitted to the network device by using the uplink resource. Therefore, the uplink transmission method provided by the embodiments of the disclosure can effectively reduce the uplink delay in the uplink resource scheduling process compared with the existing uplink resource scheduling process.

Optionally, in the embodiments of the disclosure, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Specifically, the preset information is as illustrated in Table 2:

TABLE 2

| Data volume range | Uplink reference signal configuration information |
| --- | --- |
| Data volume range 1 (for example, less than or equal to A) | Configuration 1: Sub-time-frequency resource 1, Sequence 1 |
| Data volume range 2 (for example, greater than A and less than or equal to B) | Configuration 2: Sub-time-frequency resource 2, Sequence 2 |
| Data volume range 3 (for example, greater than B and less than or equal to C) | Configuration 3: Sub-time-frequency resource 3, Sequence 3 |
| Data volume range 4 (for example, greater than C) | Configuration 4: Sub-time-frequency resource 4, Sequence 4 |

A, B and C are positive numbers, and A<B<C. The sub-time-frequency resource 1, the sub-time-frequency resource 2, the sub-time-frequency resource 3, and the sub-time-frequency resource 4 all belong to the second time-frequency resource. In the second row to the fourth row of Table 2, the first column of each row has a corresponding relationship with the second column of the row.

For the sake of brevity, in Table 2, "Configuration 1" is used to indicate uplink reference signal configuration information 1, "Sequence 1" is used to indicate an uplink reference signal sequence 1, and so on.

Configuration 1, Configuration 2, Configuration 3, and Configuration 4 are different from each other. For example, the sub-time-frequency resource 1, the sub-time-frequency resource 2, the sub-time-frequency resource 3, and the sub-time-frequency resource 4 are time-frequency resources that do not overlap each other in a time domain and a frequency domain. Sequence 1, Sequence 2, Sequence 3, and Sequence 4 are also different from each other. For example, Sequence 1 may indicate that the uplink reference signal is a certain Z-C sequence having a length of 24, and a transmission resource of the uplink reference signal is located in the middle two PRBs of the last symbol of a subframe D; Sequence 2 may indicate that the uplink reference signal is a certain Z-C sequence having a length of 72, and the transmission resource of the uplink reference signal is located in the middle six PRBs of the last second symbol of the subframe D; Sequence 3 may indicate that the uplink reference signal is a certain Z-C sequence having a length of 144, and the transmission resource of the uplink reference signal is located in the middle 12 PRBs of the last third symbol of the subframe D; and sequence 4 may indicate any other feasible uplink reference signal sequence different from Sequence 1, Sequence 2 or Sequence 3.

It is assumed that in operation 150, the terminal determines that the data volume of the uplink data required to be transmitted is within the data volume range 2 illustrated in Table 2, and determines that the data volume range 2 is a target data volume range. Based on the preset information as illustrated in Table 2, it can be seen that uplink reference signal configuration information 2 (Configuration 2 illustrated in Table 2) corresponding to the target data volume range is the sub-time-frequency resource 2 and the uplink reference signal sequence 2 (Sequence 2 illustrated in Table 2), and the sub-time-frequency resource 2 is determined as the target time-frequency resource. Specifically, in operation 130, the uplink reference signal sequence 2 is used to transmit an uplink reference signal to the network device by using the sub-time-frequency resource 2.

Optionally, in the embodiments of the disclosure, the uplink SR reported by the terminal to the network device may carry uplink reference signal configuration information corresponding to the target data volume range.

Specifically, the uplink SR reported by the terminal to the network device may carry uplink reference signal configuration information selected by the terminal. For example, the uplink SR includes information of 2 Bit.

In the embodiments of the disclosure, the network device may determine uplink reference signal configuration information selected by the terminal through the received uplink SR, and then determine a data volume range corresponding to the uplink reference signal configuration information selected by the terminal based on the preset information, so that the data volume of uplink data to be transmitted by the terminal may be estimated, and then an uplink resource is allocated to the terminal, thereby improving the efficiency of allocating the uplink resource to the terminal, and reducing the uplink delay in the uplink resource scheduling process.

It will be appreciated that Table 1 and Table 2 are only examples and are not limited. In practical applications, the preset information may be in any other feasible form such as a database other than a tabular form. The embodiments of the disclosure do not limit this.

Optionally, in some embodiments, the preset information may be pre-configured by the network device for the terminal. In the embodiments of the disclosure, the uplink transmission method 100 further includes that: the terminal acquires the preset information by receiving signaling from the network device or through system pre-configuration information.

Specifically, for example, after the network device configures the preset information for the terminal, the network device transmits RRC signaling carrying the preset information to the terminal. After receiving the RRC signaling, the terminal can determine the preset information.

Specifically, for example, after the network device configures the preset information for the terminal, system pre-configuration information is configured on the terminal by using a communication protocol, where the system pre-configuration information includes the preset information.

The terminal may determine the preset information through the system pre-configuration information.

Figure 3:
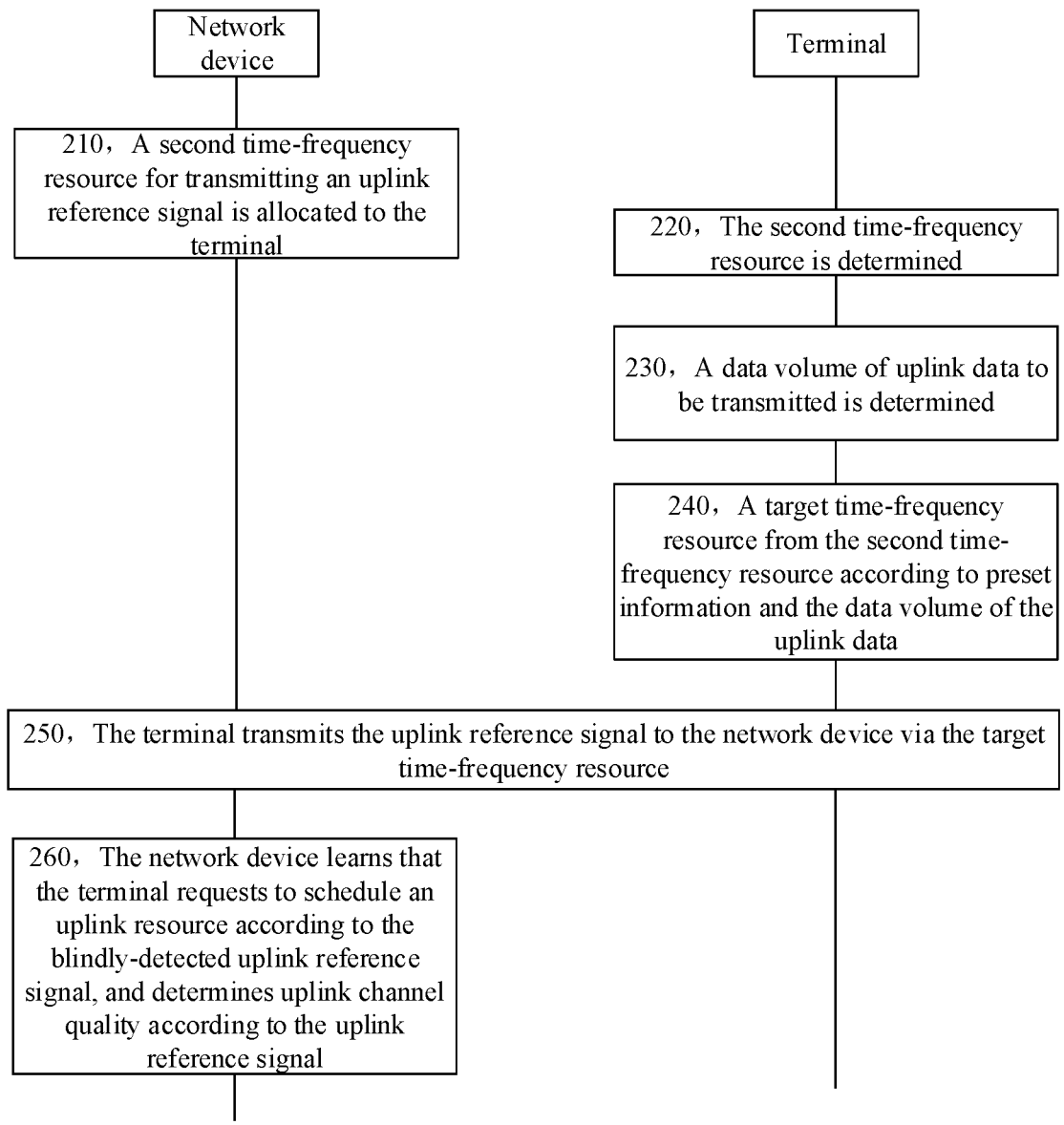
FIG. 3 is still another schematic flowchart of an uplink transmission method according to an embodiment of the disclosure.

As illustrated in FIG. 3, the embodiments of the disclosure further provide an uplink transmission method 200. The method for uplink transmission 200 includes the operations as follows.

At 210, a network device allocates a second time-frequency resource for transmitting an uplink reference signal to a terminal.

At 220, the terminal determines the second time-frequency resource allocated by the network device.

Specifically, the terminal may determine a second time-frequency resource for transmitting an uplink reference signal by receiving signaling issued by the network device or through system pre-configuration information.

At 230, responsive to that uplink data needs to be transmitted to the network device, the terminal determines a data volume of the uplink data.

At 240, a target time-frequency resource is determined from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

Specifically, the preset information is as illustrated in Table 1. For details, refer to the description above in conjunction with Table 1, and details are not described herein again.

At 250, the target time-frequency resource is used to transmit the uplink reference signal to the network device.

Specifically, the network device blindly detects the uplink reference signal transmitted by the terminal, and the network device may receive the uplink reference signal transmitted by the terminal using the target time-frequency resource by blind detection.

At 260, the network device determines that the terminal requests to schedule an uplink resource according to the blindly-detected uplink reference signal, and determines uplink channel quality according to the uplink reference signal.

Specifically, responsive to that the terminal needs to transmit uplink data, according to the size of the data volume of the uplink data to be transmitted and the preset information, a target data volume range including the size of the data volume of the uplink data to be transmitted is determined; then a target time-frequency resource corresponding to the target data volume is determined; and then, the target time-frequency resource is used to transmit the uplink reference signal to the network device. In this case, the network device may blindly detect an uplink reference signal transmitted by the terminal. After detecting the uplink reference signal transmitted by the terminal, the network device may determine that the terminal device needs to transmit uplink data. Based on the preset information and a time-frequency resource carrying the uplink reference signal, the size of the data volume of the uplink data to be transmitted by the terminal may be determined; and uplink channel quality may be estimated according to the uplink reference signal, and then an uplink resource may be allocated to the terminal based on the size of the data volume of the uplink data to be transmitted by the terminal and the estimated uplink channel quality.

As described above, in the present embodiment, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

Optionally, in the embodiments of the disclosure, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Specifically, the preset information is as illustrated in Table 2. For the related description, refer to the description above in conjunction with Table 2. For brevity, details are not described herein again.

In the embodiments of the disclosure, responsive to that the terminal needs to transmit uplink data, suitable uplink reference signal configuration information is selected from the preset information according to the size of the data volume of the uplink data to be transmitted and the preset information; and then, a target time-frequency resource indicated by the selected uplink reference signal configuration information to transmit a corresponding uplink reference signal to the network device. In this case, the network device may blindly detect an uplink reference signal transmitted by the terminal. After detecting the uplink reference signal transmitted by the terminal, the network device may determine that the terminal device needs to transmit uplink data. Based on the preset information and a time-frequency resource carrying the uplink reference signal, the size of the data volume of the uplink data to be transmitted by the terminal may be determined; and uplink channel quality may be estimated according to the uplink reference signal, and then an uplink resource may be allocated to the terminal based on the size of the data volume of the uplink data to be transmitted by the terminal and the estimated uplink channel quality.

The solution provided by the embodiments of the disclosure can effectively reduce the uplink delay in an uplink resource scheduling process. In addition, the interaction process between the network device and a base station can be reduced, and the channel burden can be reduced.

The method for uplink transmission provided by the embodiments of the disclosure is described above, and a terminal and a network device provided by the embodiments of the disclosure are described below.

Figure 4:
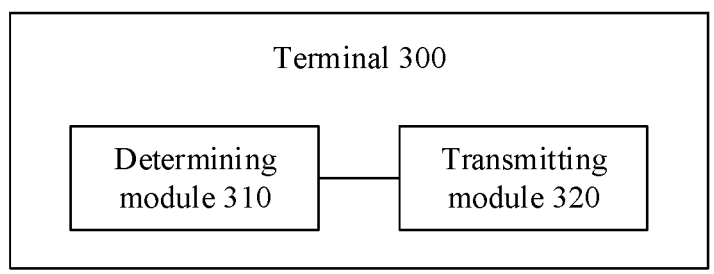
FIG. 4 is a schematic block diagram of a terminal according to an embodiment of the disclosure.

FIG. 4 is a schematic block diagram of a terminal 300 according to an embodiment of the disclosure. The terminal 300 includes a determining module 310 and a transmitting module 320.

The determining module 310 is configured to determine a first time-frequency resource and a second time-frequency resource allocated by a network device, the first time-frequency resource being used for transmitting an uplink SR, and the second time-frequency resource being used for transmitting an uplink reference signal.

The transmitting module 320 is configured to transmit, responsive to that uplink data needs to be transmitted to the network device, an uplink SR to the network device via the first time-frequency resource, and to transmit an uplink reference signal to the network device via the second time-frequency resource, so that the network device determines quality of an uplink channel by using the uplink reference signal.

In the embodiments of the disclosure, responsive to that the terminal needs to transmit uplink data, the terminal may use the pre-configured first time-frequency resource to report an uplink SR to the network device, and may also use the pre-configured second time-frequency resource to actively report an uplink reference signal to the network device, so that the network device may directly estimate uplink channel quality based on the uplink reference signal that is pre-reported by the terminal when allocating an uplink resource to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

Optionally, in some embodiments, the transmitting module 320 may include a determining unit and a transmitting unit.

The determining unit is configured to determine a data volume of uplink data required to be transmitted.

The determining unit is further configured to determine a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

The transmitting unit is configured to transmit the uplink reference signal to the network device via the target time-frequency resource.

Optionally, in some embodiments, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Optionally, in some embodiments, the uplink SR carries uplink reference signal configuration information corresponding to the target data volume range.

Optionally, in some embodiments, the terminal further includes an acquiring module.

The acquiring module is configured to acquire the preset information by receiving signaling from the network device or through system pre-configuration information.

Optionally, in some embodiments, the first resource may be a PUCCH resource, and the uplink reference signal may be an SRS.

It is to be understood that the determining module 310 may be implemented with a processor or a processor-related circuit component, and the transmitting module 320 may be implemented with a transmitter or a transmitting circuit component.

Figure 5:
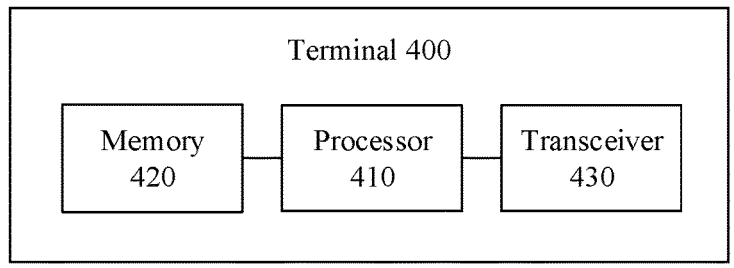
FIG. 5 is another schematic block diagram of a terminal according to an embodiment of the disclosure.

As illustrated in FIG. 5, the embodiments of the disclosure further provide a terminal 400. The terminal 400 includes a processor 410, a memory 420 and a transceiver 430. The processor 410, the memory 420 and the transceiver 430 communicate with each other through an internal connection path. The memory 420 is configured to store an instruction, and the processor 410 is configured to execute the instruction stored in the memory 420 to control the transceiver 430 to transmit and/or receive a signal. The processor 410 is configured to determine a first time-frequency resource and a second time-frequency resource allocated by a network device, the first time-frequency resource being used for transmitting an uplink SR, and the second time-frequency resource being used for transmitting an uplink reference signal; and the transceiver 430 is configured to transmit, responsive to that uplink data needs to be transmitted to the network device, an uplink SR to the network device via the first time-frequency resource, and to transmit an uplink reference signal to the network device via the second time-frequency resource, so that the network device determines quality of an uplink channel by using the uplink reference signal.

In the embodiments of the disclosure, responsive to that the terminal needs to transmit uplink data, the terminal may use the pre-configured first time-frequency resource to report an uplink SR to the network device, and may also use the pre-configured second time-frequency resource to actively report an uplink reference signal to the network device, so that the network device may directly estimate uplink channel quality based on the uplink reference signal that is pre-reported by the terminal when allocating an uplink resource to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

Optionally, in some embodiments, the processor 410 is further configured to determine a data volume of uplink data required to be transmitted, and determine a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data. The transceiver 430 is specifically configured to transmit the uplink reference signal to the network device via the target time-frequency resource.

Optionally, in some embodiments, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Optionally, in some embodiments, the uplink SR carries uplink reference signal configuration information corresponding to the target data volume range.

Optionally, in some embodiments, the processor 410 is configured to acquire the preset information by receiving signaling from the network device and received by the transceiver 430 or through system pre-configuration information.

Optionally, in some embodiments, the first resource may be a PUCCH resource, and the uplink reference signal may be an SRS.

It is to be understood that the terminal 400 provided by the embodiments of the disclosure may correspond to the terminal 300 according to the embodiments of the disclosure, and the terminal 300 or the terminal 400 in the foregoing embodiment may correspond to the terminal in the uplink transmission method 100 of the embodiments of the disclosure. The foregoing operations and/or functions of the modules in the terminal 300 or the terminal 400 are respectively used to implement the corresponding processes in the foregoing method embodiments. For brevity, no further details are provided herein.

Figure 6:
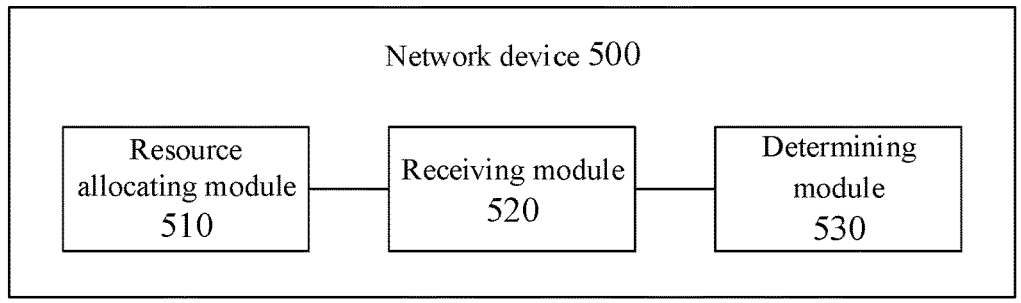
FIG. 6 is a schematic block diagram of a network device according to an embodiment of the disclosure.

FIG. 6 is a schematic block diagram of a network device 500 according to an embodiment of the disclosure. The terminal 500 includes a resource allocating module 510, a receiving module 520 and a determining module 530.

The resource allocating module 510 is configured to allocate a first time-frequency resource and a second time-frequency resource to a terminal, the first time-frequency resource being used for transmitting an uplink SR, and the second time-frequency resource being used for transmitting an uplink reference signal.

The receiving module 520 is configured to receive, responsive to that the terminal needs to transmit uplink data, an uplink SR which is transmitted by the terminal via the first time-frequency resource, and receive an uplink reference signal which is transmitted by the terminal via the second time-frequency resource.

The determining module 530 is configured to determine uplink channel quality according to the uplink reference signal transmitted by the terminal.

In the embodiments of the disclosure, responsive to that the terminal needs to transmit uplink data, the terminal may use the pre-configured first time-frequency resource to report an uplink SR to the network device, and may also use the pre-configured second time-frequency resource to actively report an uplink reference signal to the network device, so that the network device may directly estimate uplink channel quality based on the uplink reference signal that is pre-reported by the terminal when allocating an uplink resource to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

Optionally, in some embodiments, the receiving module 520 is specifically configured to receive the uplink reference signal which is transmitted by the terminal via a target time-frequency resource in the second time-frequency resource, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

Optionally, in some embodiments, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Optionally, in some embodiments, the uplink SR carries uplink reference signal configuration information corresponding to the target data volume range.

Optionally, in some embodiments, the determining module 530 is further configured to determine the target data volume range according to the preset information and the target time-frequency resource, and estimate a data volume of uplink data to be transmitted by the terminal according to the preset information and the target time-frequency resource.

The resource allocating module 510 is further configured to allocate an uplink resource to the terminal according to the uplink channel quality and the estimated data volume of the uplink data to be transmitted by the terminal.

Optionally, in some embodiments, the network device 500 further includes a generating module and a notifying module.

The generating module is configured to generate the preset information.

The notifying module is configured to notify the terminal of the preset information by signaling issuing or system pre-configuration.

Optionally, in some embodiments, the first resource may be a PUCCH resource, and the uplink reference signal may be an SRS.

It is to be understood that the resource allocating module 510, the determining module 530 and the generating module in the network device 500 may all be implemented by using a processor or a processor-related circuit component. The receiving module 520 may be implemented with a transceiver or a transceiver circuit assembly.

Figure 7:
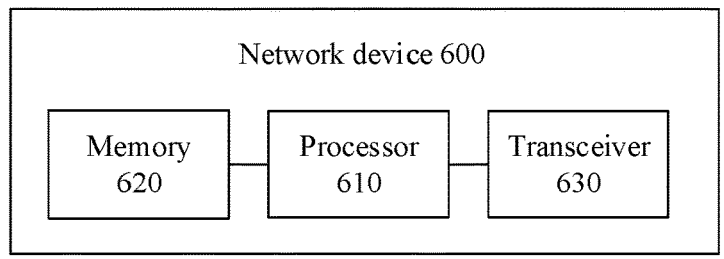
FIG. 7 is another schematic block diagram of a network device according to an embodiment of the disclosure.

As illustrated in FIG. 7, the embodiments of the disclosure further provide a network device 600. The network device 600 includes a processor 610, a memory 620 and a transceiver 630. The processor 610, the memory 620 and the transceiver 630 communicate with each other through an internal connection path. The memory 620 is configured to store an instruction, and the processor 610 is configured to execute the instruction stored in the memory 620 to control the transceiver 630 to receive and/or transmit a signal. When the instruction is executed, the processor 610 is configured to allocate a first time-frequency resource and a second time-frequency resource to a terminal, the first time-frequency resource being used for transmitting an uplink SR, and the second time-frequency resource being used for transmitting an uplink reference signal; the transceiver 630 is configured to receive, responsive to that the terminal needs to transmit uplink data, an uplink SR which is transmitted by the terminal via the first time-frequency resource, and receive an uplink reference signal which is transmitted by the terminal via the second time-frequency resource; and the processor 610 is further configured to determine uplink channel quality according to the uplink reference signal transmitted by the terminal.

In the embodiments of the disclosure, responsive to that the terminal needs to transmit uplink data, the terminal may use the pre-configured first time-frequency resource to report an uplink SR to the network device, and may also use the pre-configured second time-frequency resource to actively report an uplink reference signal to the network device, so that the network device may directly estimate uplink channel quality based on the uplink reference signal that is pre-reported by the terminal when allocating an uplink resource to the terminal. Compared with the conventional art in which the network device may need to temporarily instruct the terminal to report an uplink reference signal when allocating an uplink resource to the terminal, the uplink transmission method provided by the embodiments of the disclosure can effectively reduce the uplink delay in the uplink resource scheduling process.

Optionally, in some embodiments, the transceiver 630 is specifically configured to receive the uplink reference signal which is transmitted by the terminal via a target time-frequency resource in the second time-frequency resource, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

Optionally, in some embodiments, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

Optionally, in some embodiments, the uplink SR carries uplink reference signal configuration information corresponding to the target data volume range.

Optionally, in some embodiments, the processor 610 is further configured to estimate a data volume of uplink data to be transmitted by the terminal according to the preset information and the target time-frequency resource, and allocate an uplink resource to the terminal according to the uplink channel quality and the estimated data volume of the uplink data to be transmitted by the terminal.

Optionally, in some embodiments, the processor 610 is further configured to generate the preset information, and notify the terminal of the preset information by using a system pre-configuration or signaling issued by the transceiver 630.

Optionally, in some embodiments, the first resource may be a PUCCH resource, and the uplink reference signal may be an SRS.

It is to be understood that the network device 600 provided by the embodiments of the disclosure may correspond to the network device 500 according to the embodiments of the disclosure, and the network device 500 or the network device 600 in the foregoing embodiment may correspond to the network device in the uplink transmission method 100 of the embodiments of the disclosure. The foregoing operations and/or functions of the modules in the network device 500 or the network device 600 are respectively used to implement the corresponding processes in the foregoing method embodiments. For brevity, no further details are provided herein.

Figure 8:
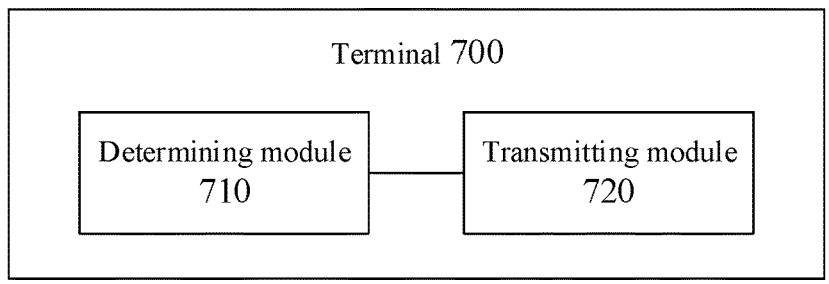
FIG. 8 is still another schematic block diagram of a terminal according to an embodiment of the disclosure.

As illustrated in FIG. 8, the embodiments of the disclosure further provide a terminal 700. The terminal 700 includes a determining module 710 and a transmitting module 720.

The determining module 710 is configured to determine a second time-frequency resource allocated by a network device and used for transmitting an uplink reference signal.

The determining module 710 is further configured to determine, responsive to that uplink data needs to be transmitted to the network device, a data volume of the uplink data.

The determining module 710 is further configured to determine a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

The transmitting module 720 is configured transmit an uplink reference signal to the network device via the target time-frequency resource, so that the network device determines uplink channel quality according to the uplink reference signal, the uplink reference signal being further used in requesting the network device to schedule an uplink resource.

Specifically, the description of the preset information is as described above in conjunction with the description of Table 1. For the sake of brevity, details are not described herein.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

Optionally, in some embodiments, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

For details, refer to the description above in conjunction with Table 2, and for brevity, details are not described herein again.

It is to be understood that the terminal 700 may correspond to the terminal in the uplink transmission method 200 provided by the embodiments of the disclosure. To avoid repetition, details are not described herein again.

The embodiments of the disclosure further provide a terminal, which may correspond to the terminal in the uplink transmission method 200 provided by the embodiments of the disclosure, and can implement various processes related to the terminal in the uplink transmission method 200. To avoid repetition, details are not described herein again. The terminal may also correspond to the terminal 700 provided by the embodiments of the disclosure. Specifically, referring to FIG. 5, the terminal may include a processor, a memory and a transceiver, wherein the memory is configured to store an instruction, and the processor is configured to read the instruction stored in the memory to control the transceiver to receive or transmit a signal. When the instruction in the memory is executed, the processor is configured to: determine a second time-frequency resource allocated by a network device and used for transmitting an uplink reference signal; determine, responsive to that uplink data needs to be transmitted to the network device, a data volume of the uplink data; determine a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data; and use the target time-frequency resource to transmit an uplink reference signal to the network device, so that the network device determines uplink channel quality according to the uplink reference signal, the uplink reference signal being further used in requesting the network device to schedule an uplink resource.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

Figure 9:
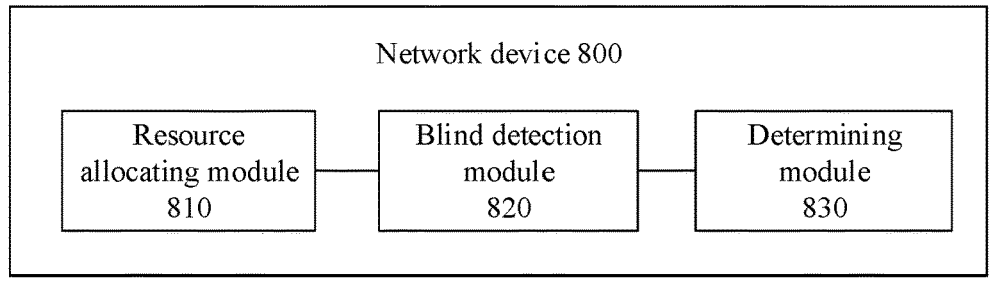
FIG. 9 is still another schematic block diagram of a network device according to an embodiment of the disclosure.

FIG. 9 is a schematic block diagram of a network device 800 according to an embodiment of the disclosure. The terminal 800 includes a resource allocating module 810, a blind detection module 820 and a determining module 830.

The resource allocating module 810 is configured to allocate to a terminal a second time-frequency resource for transmitting an uplink reference signal.

The blind detection module 820 is configured to blindly detect an uplink reference signal which is transmitted by the terminal via a target time-frequency resource in the second time-frequency resource, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data.

The determining module 830 is configured to determine that the terminal requests to schedule an uplink resource according to the blindly-detected uplink reference signal, and determine uplink channel quality according to the uplink reference signal.

Specifically, the description of the preset information is as described above in conjunction with the description of Table 1. For the sake of brevity, details are not described herein.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

Optionally, in the embodiments of the disclosure, the preset information includes correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

For details, refer to the description above in conjunction with Table 2, and for brevity, details are not described herein again.

It is to be understood that the network device 800 may correspond to the network device in the uplink transmission method 200 provided by the embodiments of the disclosure. To avoid repetition, details are not described herein again.

The embodiments of the disclosure further provide a network device, which may correspond to the network device in the uplink transmission method 200 provided by the embodiments of the disclosure, and can implement various processes related to the network device in the uplink transmission method 200. To avoid repetition, details are not described herein again. The network device may also correspond to the network device 800 provided by the embodiments of the disclosure. Specifically, referring to FIG. 7, the network device may include a processor, a memory and a transceiver, wherein the memory is configured to store an instruction, and the processor is configured to read the instruction stored in the memory to control the transceiver to receive or transmit a signal. When the instruction in the memory is executed, the processor is configured to: allocate a second time-frequency resource for transmitting an uplink reference signal to a terminal; blindly detect an uplink reference signal which is transmitted by the terminal via a target time-frequency resource in the second time-frequency resource, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range including the size of the data volume of the uplink data; and determine that the terminal requests to schedule an uplink resource according to the blindly-detected uplink reference signal, and uplink channel quality is determined according to the uplink reference signal.

In the embodiments of the disclosure, the uplink reference signal transmitted by the terminal to the network device bears dual functions of an uplink SR and uplink channel sounding. The solution provided by the embodiments of the disclosure can effectively reduce the uplink delay in an uplink resource scheduling process. In addition, the interaction process between the network device and a base station can be reduced, and the channel burden can be reduced.

It is to be understood that in the embodiments of the disclosure, the processor may be a Central Processing Unit (CPU), and the processor may also be other general-purpose processors, Digital Signal Processors (DSPs), Application Specific Integrated Circuits (ASICs), Field Programmable Gate Arrays (FPGAs) or other programmable logic devices, discrete gate or transistor logic devices, discrete hardware components, and the like. The general-purpose processor may be a microprocessor, or the processor may be any conventional processor.

It is also to be understood that the memory involved in the embodiments of the disclosure may include a Read-Only Memory (ROM) and a Random Access Memory (RAM) and provides instructions and data to the processor. A portion of the memory may also include a non-volatile random access memory. For example, the memory may also store information of a device type.

In the implementation process, each operation of the above method may be completed by an integrated logic circuit of hardware in the processor or an instruction in the form of software. The operations of the method disclosed in the embodiment of the disclosure may be directly implemented as a hardware processor, or may be performed by a combination of hardware and software modules in the processor. The software module may be located in a mature storage medium such as a RAM, a flash memory, a ROM, a programmable ROM or an electrically erasable programmable memory, and a register. The storage medium is located in the memory, and the processor reads information in the memory and completes the operations of the above method in combination with hardware thereof. To avoid repetition, no descriptions will be made herein.

It is also to be understood that the various reference numerals involved in the disclosure are only for the convenience of description and are not limited to the scope of the embodiments of the disclosure.

It is to be understood that the term "and/or" herein is merely an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

It is to be understood that in the embodiments of the disclosure, the size of the sequence numbers of the above processes does not mean the order of execution, and the order of execution of each process should be determined by its function and internal logic, and should not make any limitation to the implementation process of the embodiment of the disclosure.

Those of ordinary skill in the art will appreciate that the units and algorithm operations of various examples described in combination with the embodiments disclosed herein can be implemented in electronic hardware or a combination of computer software and electronic hardware. Whether these functions are performed in the form of hardware or software depends on specific application and design constraints of the technical solution. Those skilled in the art can use different methods for implementing the described functions for each particular application, but such implementation should not be considered to be beyond the scope of the embodiments of the disclosure.

In the technical solution provided by the embodiments of the disclosure, it will be appreciated that the disclosed systems, apparatuses, and methods may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, the coupling or direct coupling or communication connection illustrated or discussed may be an indirect coupling or communication connection through some interfaces, apparatuses or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the essence of the technical solution of the embodiments of the disclosure or a part contributing to the conventional art or a part of the technical solution may be embodied in the form of a software product stored in a storage medium, including a plurality of instructions used to cause a computer device (which may be a personal computer, server, or network device, etc.) to perform all or part of the operations of the methods described in various embodiments of the disclosure. The foregoing storage medium includes: a U disk, a mobile hard disk, a ROM, a RAM, a magnetic disk, or an optical disk, and the like, which may store a program code.

The above is only the specific implementation of the embodiments of the disclosure, but the scope of protection of the embodiments of the disclosure is not limited thereto. Any person skilled in the art can easily think of changes or replacements within the technical scope disclosed by the embodiments of the disclosure, which should be covered by the scope of protection of the embodiments of the disclosure. Therefore, the scope of protection of the embodiments of the disclosure should be determined by the scope of the claims.

The invention claimed is:

1. A method for uplink transmission, comprising:
   determining a first time-frequency resource and a second time-frequency resource allocated by a network device, the first time-frequency resource being used for transmitting an uplink Scheduling Request (SR), and the second time-frequency resource being used for transmitting an uplink reference signal; and
   responsive to that uplink data needs to be transmitted to the network device, transmitting the uplink SR to the network device via the first time-frequency resource, and transmitting the uplink reference signal to the network device via the second time-frequency resource, so that the network device determines quality of an uplink channel by using the uplink reference signal.

2. The method for uplink transmission of claim 1, wherein transmitting the uplink reference signal to the network device via the second time-frequency resource comprises:
   determining a data volume of uplink data required to be transmitted;
   determining a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range comprising a size of the data volume of the uplink data; and
   transmitting the uplink reference signal to the network device via the target time-frequency resource.

3. The method for uplink transmission of claim 2, wherein the preset information comprises correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

4. The method for uplink transmission of claim 3, wherein the uplink SR carries uplink reference signal configuration information corresponding to the target data volume range.

5. The method for uplink transmission of claim 2, further comprising:
   acquiring the preset information by receiving signaling from the network device or through system pre-configuration information.

6. The method for uplink transmission of claim 1, wherein the first resource is a Physical Uplink Control Channel (PUCCH) resource, and the uplink reference signal is a Sounding Reference Signal (SRS).

7. A terminal, comprising:
   a processor, configured to determine a first time-frequency resource and a second time-frequency resource allocated by a network device, the first time-frequency resource being used for transmitting an uplink Scheduling Request (SR), and the second time-frequency resource being used for transmitting an uplink reference signal; and
   a transceiver, configured to transmit, responsive to that uplink data needs to be transmitted to the network device, the uplink SR to the network device via the first time-frequency resource, and transmit the uplink reference signal to the network device via the second time-frequency resource, so that the network device determines quality of an uplink channel by using the uplink reference signal.

8. The terminal of claim 7, wherein the transceiver is configured to
   determine a data volume of uplink data required to be transmitted,
   determine a target time-frequency resource from the second time-frequency resource according to preset information and the data volume of the uplink data, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range comprising a size of the data volume of the uplink data; and transmit the uplink reference signal to the network device via the target time-frequency resource.

9. The terminal of claim 8, wherein the preset information comprises correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

10. The terminal of claim 9, wherein the uplink SR carries uplink reference signal configuration information corresponding to the target data volume range.

11. The terminal of claim 8, the transceiver is further configured to acquire the preset information by receiving signaling from the network device or through system pre-configuration information.

12. The terminal of claim 7, wherein the first resource is a Physical Uplink Control Channel (PUCCH) resource, and the uplink reference signal is a Sounding Reference Signal (SRS).

13. A network device, comprising:
a processor, configured to allocate a first time-frequency resource and a second time-frequency resource to a terminal, the first time-frequency resource being used for transmitting an uplink Scheduling Request (SR), and the second time-frequency resource being used for transmitting an uplink reference signal; and
a transceiver, configured to receive, responsive to that the terminal needs to transmit uplink data, the uplink SR which is transmitted by the terminal via the first time-frequency resource, and receive the uplink reference signal which is transmitted by the terminal via the second time-frequency resource,
wherein the processor is further configured to determine uplink channel quality according to the uplink reference signal transmitted by the terminal.

14. The network device of claim 13, wherein the transceiver is specifically configured to receive the uplink reference signal which is transmitted by the terminal via a target time-frequency resource in the second time-frequency resource, the target time-frequency resource being determined by the terminal according to preset information and a data volume of uplink data required to be transmitted by the terminal, the preset information indicating correspondences between data volume ranges and sub-time-frequency resources in the second time-frequency resource, the target time-frequency resource being a sub-time-frequency resource, which corresponds to a target data volume range, of the second time-frequency resource, and the target data volume range comprising a size of the data volume of the uplink data.

15. The network device of claim 14, wherein the preset information comprises correspondences between data volume ranges and uplink reference signal configuration information, the uplink reference signal configuration information is used for indicating a time-frequency resource and sequence of an uplink reference signal, different data volume ranges correspond to different uplink reference signal configuration information, and the target time-frequency resource is a time-frequency resource indicated by the uplink reference signal configuration information corresponding to the target data volume range.

16. The network device of claim 15, wherein the uplink SR carries uplink reference signal configuration information corresponding to the target data volume range.

17. The network device of claim 14, wherein the processor is further configured to estimate a data volume of uplink data to be transmitted by the terminal according to the preset information and the target time-frequency resource; and allocate an uplink resource to the terminal according to the uplink channel quality and the estimated data volume of the uplink data to be transmitted by the terminal.

18. The network device of claim 14, wherein
the processor is further configured to generate the preset information; and
the transceiver is further configured to notify the terminal of the preset information by signaling issuing or system pre-configuration.

19. The network device of claim 13, wherein the first resource is a Physical Uplink Control Channel (PUCCH) resource, and the uplink reference signal is a Sounding Reference Signal (SRS).

* * * * *